United States Patent Office 2,711,797
Patented June 28, 1955

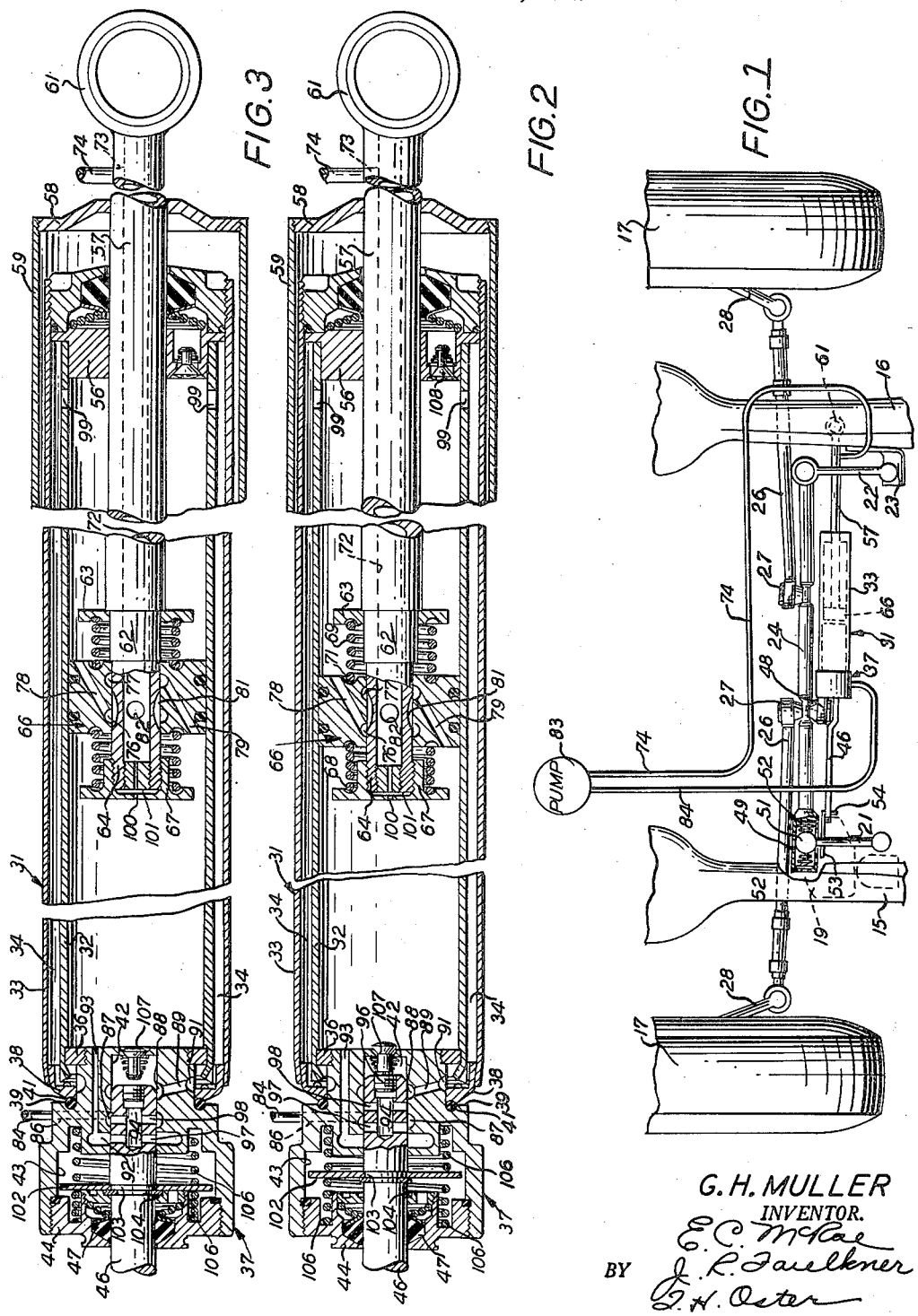

2,711,797

POWER STEERING DEVICE OF THE HYDRAULIC TYPE

George H. Muller, Northville, Mich., assignor to Ford Motor Company, Dearborn, Mich., a corporation of Delaware Application October 17, 1952, Serial No. 315,351

5 Claims. (Cl. 180—79.2)

This invention relates generally to power steering devices and has particular reference to a motor vehicle steering mechanism in which the manual steering effort is reduced by the assistance of a hydraulic power unit whenever the manual steering effort exceeds a predetermined amount.

The present invention is particularly adapted for use in connection with power steering devices of the booster type in which a cylinder and piston assembly is connected between a stationary frame member and a movable part of the steering linkage, although it may also be used in connection with other types of power steering systems.

In an embodiment of the invention the booster unit comprises a double cylinder and piston slidable on a piston rod and incorporating some of the features shown in my application for Power Steering Mechanism filed concurrently herewith. In addition, the device incorporates a control valve assembly supported at one end of the double cylinder and arranged to direct fluid under pressure either directly into the adjacent end of the inner cylinder or through the annular space between the two cylinders and thence through ports in the inner cylinder wall into the opposite end of the inner cylinder. As an additional feature the valve mechanism incorporates a dampening unit to avoid interferences coming from wheel shimmy and fight.

A further object of the invention is to provide a power steering device of the booster type in which a minimum of external exposed conduits are required. This is accomplished partly by utilizing the annular space between the two cylinders as a pressure passage to one end of the inner cylinder, as mentioned. In addition, the piston rod is provided with an axial passage therethrough forming a return conduit to return exhaust fluid from the opposite ends of the cylinder to the pump. The inner end of the piston rod and the sliding piston thereon have cooperating passageways arranged to connect the return passage in the piston rod to the appropriate end of the cylinder.

Other objects and advantages of this invention will be made more apparent as this description proceeds, particularly when considered in connection with the accompanying drawings, in which:

Figure 1 is a semi-diagrammatic plan view of the forward portion of a motor behicle chassis incorporating the power steering device of the present invention.

Figure 2 is an enlarged transverse cross-sectional view through the cylinder, piston and valve assembly shown in Figure 1, with the parts thereof shown in the relative positions they assume during straight ahead manual steering without power assistance.

Figure 3 is a cross-sectional view similar to Figure 2 but showing the parts in their relative positions during a right turn.

Referring now to the drawings, and particularly to Figure 1, the reference characters 15 and 16 indicate the side frame members of a motor vehicle chassis, and the reference character 17 the front road wheels of the vehicle. The front road wheels 17 are mounted for turning movement about conventional king pins (not shown) and are controlled by conventional steering linkage and a manually operable steering gear. The steering gear assembly 19 is in this case mounted upon the left side frame member 15 and actuates a pitman arm 21. Located generally symmetrically opposite the pitman arm 21 is an idler arm 22 pivotally connected at its rearward end to a bracket 23 carried by the right side frame member 16. A drag link 24 extends between the forward ends of the pitman arm 21 and the idler arm 22, being pivotally connected thereto. The inner ends of a pair of tie rods 26 are connected by means of ball joints 27 to laterally spaced intermediate points on the drag link 24. The outer ends of the tie rods 26 are pivotally connected to the rearward ends of the spindle arms 28 of the front road wheels 17. The construction thus far described is conventional and is utilized, with some variations in the linkage, in the majority of vehicles produced today.

To provide power assistance to the manual steering mechanism described above, there is provided a power steering device incorporating a cylinder assembly 31 having coaxial inner and outer cylinders 32 and 33 respectively, forming therebetween an annular chamber 34. The left hand end of the inner cylinder 32 is crimped around a locking ring 36 threaded into the end of a valve housing 37. The adjacent end of the outer cylinder 33 is welded to an end cap 38 engaging a shoulder 39 of the valve housing through a sealing ring 41.

The valve housing 37 is provided with an axial bore 42 and with an enlarged chamber 43 adjacent thereto. The chamber 43 is closed by an end cap 44 through which the valve rod 46 extends. A sealing ring 47 is carried by the end cap 44 and engages the valve rod 46.

As best seen in Figure 1, the valve housing 37 is formed with an integral laterally extending flange 48 connected to the ball joint 27 between the drag link 24 and the tie rod 26 so that the valve and cylinder unit moves laterally with the steering linkage.

The connection between the pitman arm 21 and the drag link 24 is conventional, and provides for a limited lost motion therebetween. As shown diagrammatically in Figure 1, the end of the drag link 24 is formed with a hollow socket 49 receiving the ball end 51 of the pitman arm. A pair of coil springs 52 on opposite sides of the ball 51 are retained within the socket 49 of the drag link and serve to normally center the ball 51 of the pitman arm therein. The reference character 53 indicates a dust cover carried by the pitman arm 21 and covering the adjacent slot formed in the socket 49 of the drag link to accommodate the movement of the pitman arm relative thereto. The dust cover 53 is formed with a flange 54 which is secured to the end of the valve rod 46. It will be apparent that when steering effort is applied manually to the steering wheel, the pitman arm ball 51 moves in one direction or the other relative to the drag link 24 a slight distance prior to manual steering effort being transmitted to the drag link and the associated steering linkage. Inasmuch as the valve housing 37 is secured to the drag link, this relative movement results in moving the valve rod within the valve housing and this movement is utilized to actuate the power steering device.

The right hand ends of the inner and outer cylinders 32 and 33 are connected to an end cap 56 through which the piston rod 57 reciprocates. The piston rod 57 also carries a ring 58 to which a dust cover 59 is supported. The outer end of the piston rod 57 is welded to an eye 61 which in turn is pivotally connected to the right side frame member 16. Rubber bushings (not shown) may be used to insulate this pivotal connection.

Near its inner end the piston rod 57 is provided with a reduced portion 62 forming with the body portion of the rod a shoulder against which a spring retainer 63 is seated. The piston rod is provided with a further reduced portion 64 upon which the piston 66 is slidably mounted. A second spring retainer 67 is threaded onto the end of the piston rod. Sliding movement of the piston 66 on the piston rod is limited in one direction by the shoulder between the portions 62 and 64 of the piston rod and in the other direction by the hub of the spring retainer 67. A pair of coil springs 68 and 69 are provided on opposite sides of the piston 66, between the piston and the spring retainers 67 and 63. The spring retainer and the piston are formed with annular grooves 71 within which are seated the ends of the coil springs. The coil springs normally center the piston 66 centrally of the reduced portion 64 of the piston rod, as shown in Figure 2.

The piston rod 57 is provided with an axial passage 72 from the inner end thereof to a point outside the cylinders and the dust cover. A radial port 73 in the outer end of the piston rod forms the communication between the axial return passage 72 in the rod and an external conduit 74 leading to the pump.

The piston 66 is provided with a pair of axially spaced annular grooves 76 and 77. The groove 76 communicates with a diagonal passageway 78 extending through the piston to the right hand face thereof while the groove 77 communicates with a similar diagonal passageway 79 extending through the piston and communicating with the opposite face thereof. The reduced portion 64 of the piston rod is formed with an annular groove 81 communicating, in the centered position of the piston as shown in Figure 2, with the annular grooves 76 and 77 of the piston. It will thus be seen that during manual steering or during a recovery stroke, free communication between the opposite ends of the cylinder is provided through the piston by means of the interconnected passageways and grooves 78, 76, 81, 77 and 79.

The piston rod is also provided, in its reduced portion 64, with a radial port 82 extending between the axial return passage 72 of the piston rod and the annular groove 81 formed on its periphery. This completes communication between the return conduit 74 and the cylinder at one side or the other of the piston during a power stroke. For example, in Figure 3, fluid pressure increases in the left hand end of the inner cylinder 32 moving the piston 66 to the right against the stop formed by the shoulder between the portions 62 and 64 of the piston rod. In this position of the piston the reduced portion 64 of the piston rod blocks the annular groove 77 in the piston and consequently closes the diagonal passageway 79 so that continued fluid pressure application is effective to result in relative extension of the cylinder and piston assembly. In this position, however, the annular groove 76 in the piston is aligned with the annular groove 81 in the piston rod to provide communication from the right hand end of the cylinder through the diagonal passageway 78 in the piston, the grooves 76 and 81, and the radial port 82 to the axial return passage 72 in the piston rod. It will be apparent that during a right turn the fluid in the left hand end of the cylinder is exhausted to the pump through the passageway in the piston rod.

Referring now to Figure 1, it will be seen that a conventional pump 83 is connected to the return conduit 74 and also to a pressure conduit 84. The pressure conduit 84 delivers fluid under pressure to a passageway 86 in the valve housing 37 (Figures 2 and 3) which in turn communicates with an annular groove 87 formed in the valve housing adjacent the bore 42. To the right of the annular groove 87 the valve housing is formed with a second annular groove 88 communicating through a passageway 89 and an annular groove 91 with the annular chamber 34 between the inner and outer cylinders 32 and 33 respectively. The valve housing is also formed with an enlarged annular groove 92 on the opposite side of the pressure groove 87 communicating through a passageway 93 with the adjacent end of the inner cylinder 32.

The inner end of the valve rod 46 is formed with an axial passageway 94 closed at its outer end by a plug 96, and with a pair of axially spaced diagrammatically extending passageways 97 and 98 in the neutral position of the mechanism. As shown in Figure 2, the valve rod is so positioned in the valve housing 37 as to block communication between the pressure groove 87 and the adjacent annular grooves 88 and 92. When, however, the valve rod has been shifted relative to the valve housing, in the manner described previously, the valve rod provides communication from the pressure groove 87 to one of the grooves 88 and 92. During a right turn, as shown in Figure 3, the valve rod is moved so that the passageway 98 is aligned with the pressure groove 87 and the passageway 97 is aligned with the groove 92. It will be apparent that fluid under pressure is thus transmitted through the passageways 92 and 93 to the adjacent end of the inner cylinder 32, to first move the piston 66 on the piston rod 57 adjacent its stop and to then move the cylinder assembly to the left to apply a corresponding power steering effort to the drag link 24 to augment the manual steering effort.

A left turn results in moving the valve rod 46 to the right from the neutral position shown in Figure 2 so that the passageways 97 and 98 in the valve rod are respectively aligned with the grooves 87 and 88 in the valve housing 37. Fluid pressure is thus directed through the passageway 89 and groove 91 to the annular chamber 34 between the two cylinders. Ports 99 are provided in the inner cylinder 32 adjacent the end cap 56 to admit the fluid pressure to the right hand end of the cylinder, first shifting the piston 66 to the left and thereafter shifting the cylinder assembly to the right to apply a power steering effort to the drag link in a direction to effect a left turn.

It will be noted that the effective area of the left hand end of the piston is greater than the effective area of the right hand end thereof due to the cross sectional area of the piston rod 57. Consequently, the application of equal fluid pressure at opposite ends of the cylinder would result in a variation in the power steering effort between left and right turns. The present construction, however, provides a restricted orifice 100 through the retainer 67 and an aligned orifice 101 in the plug in the end of the piston rod to provide a leakage passageway of restricted area from the left hand end of the inner cylinder to the axial return passageway 72 in the piston rod. This reduces the effective pressure in the left hand end of the cylinder and enables the force applied to the piston in the two directions of steering to be substantially equal.

Referring again to Figure 2, it will be seen that a dampening disk 102 is carried by the valve rod 46, being held between a shoulder 103 on the valve rod and a retaining ring 104. The disk is positioned so as to be located centrally of the annular chamber 43 in the valve housing in the neutral position of the valve rod. A pair of centering springs 106 cooperates with the springs 52 of the pitman arm connection to hold the valve rod in its neutral position. The dampening disk 102 is slightly smaller in overall diameter than the internal diameter of the chamber 43 in the valve housing to permit a transfer of fluid between the opposite sides of the disk 102 during movement of the valve rod 46. Thus, movement of the disk 102 in the static oil contained in the chamber 43 applies a dampening action to the movement of the valve rod preventing too sudden movement of the latter resulting from wheel shimmy or fight due to too sudden an application of power steering effort.

A small spring loaded valve 107 is provided in the valve housing 37 at the inner end of the bore 42 thereof and is arranged to be opened by the adjacent end of the valve rod 46 to release the fluid trapped in the bore 42. Another spring loaded valve 108 is provided in the end cap 56, opening when the pressure increases in the chamber in the end cap above the pressure in the adjacent end of the cylinder, as during a right turn.

It will be understood that the invention is not to be limited to the exact construction shown and described, but that various changes and modifications may be made without departing from the spirit and scope of the invention, as defined in the appended claims.

What is claimed is:

1. In a power steering device for a motor vehicle having a frame member, steerable road wheels and a movable steering member arranged to transmit steering effort to said road wheels, a first cylinder connected to one of said members, a piston reciprocable within said cylinder, a piston rod for said piston extending through the end of said cylinder and connected to the other of said members, a second cylinder surrounding said first cylinder to provide a chamber therebetween, a source of fluid pressure, valve means in the end of said cylinder remote from said piston rod for controlling the flow of fluid from said source to said first cylinder, a passageway from said valve means directly into the adjacent end of said cylinder, a second passageway from said valve means to said chamber, a third passageway from said chamber into the end of said first cylinder remote from said valve means, said piston being slidably mounted upon the inner end of said piston rod for relative axial movement with respect thereto throughout a predetermined range, a return passageway in said piston rod extending exteriorly of said cylinders, and passageways in said piston and piston rod establishing communication between one end of said cylinder and said return passageway in one relative position of said piston and piston rod and between the other end of said cylinder and said return passageway in another relative position thereof.

2. In a power steering device for a motor vehicle having a frame member, steerable road wheels and a movable steering member arranged to transmit steering effort to said road wheels, a cylinder connected to one of said members, a piston reciprocable within said cylinder, a piston rod for said piston extending through the end of said cylinder and connected to the other of said members, a source of fluid pressure, valve means in the end of said cylinder remote from said piston rod controlling the flow of fluid from said source to said cylinder on opposite sides of said piston, said piston rod having a return passageway extending axially of said piston rod, a conduit communicating with said return passageway exteriorly of said cylinder and also communicating with said source of fluid pressure on the return side thereof, and said piston rod having an orifice extending from the inner end of said piston rod to said return passageway to form a bleed passage between said return passageway and the end of said cylinder on the side of said piston opposite said piston rod to lower the operating pressure in the end of said cylinder remote from said piston rod to compensate for the area of the piston rod and obtain substantially equally operating forces on the opposite sides of said piston.

3. In a power steering device for a motor vehicle having a frame, steerable road wheels connected to said frame, and steering linkage including a laterally movable drag link arranged to transmit steering effort to said road wheels, a cylinder extending adjacent said drag link, a valve housing secured to one end of said cylinder and connected to said drag link, a piston reciprocable within said cylinder, a piston rod for said piston extending through the end of said cylinder remote from said valve housing and connected to said frame, a source of fluid pressure, said valve housing having a bore therein and an enlarged chamber adjacent thereto, a valve extending through said enlarged chamber and into said bore and having passages therein for cooperation with passages in said valve housing as said valve is reciprocated to direct fluid from said source to said cylinder, a flat disc secured to said valve within said enlarged chamber, and centering springs on opposite sides of said flat disc, said disc moving with said valve to dampen the movement of said valve.

4. In a power steering device for a motor vehicle having a frame member, steerable road wheels and a movable steering member arranged to transmit steering effort to said road wheels, a first cylinder connected to one of said members, a piston reciprocable within said cylinder, a piston rod for said piston extending through the end of said cylinder and connected to the other of said members, a second cylinder surrounding said first cylinder to provide a chamber therebetween, a source of fluid pressure, valve means in the end of said cylinder remote from said piston rod for controlling the flow of fluid from said source to said first cylinder, a passageway from said valve means directly into the adjacent end of said cylinder, a second passageway from said valve means to said chamber, a third passageway from said chamber into the end of said first cylinder remote from said valve means, said piston being slidably mounted upon the inner end of said piston rod for relative axial movement with respect thereto throughout a predetermined range, the inner end of said piston rod being provided with an annular peripheral groove in position to be covered by said sliding piston, a return passageway extending axially within said piston rod and one end extending exteriorly of said cylinders and at its opposite and inner end communicating with said annular peripheral groove, and a pair of passageways in said piston extending from opposite sides of the piston and communicating with the peripheral groove in the piston rod, one of said pair of passageways communicating with said peripheral groove in one relative position of said piston and piston rod and the other of said passageways communicating with said peripheral groove in another relative position of said piston and piston rod.

5. In a power steering device for a motor vehicle having a frame member, steerable road wheels and a movable steering member arranged to transmit steering effort to said road wheels, a cylinder connected to one of said members, a piston reciprocable within said cylinder, a piston rod for said piston extending through the end of said cylinder and connected to the other of said members, a source of fluid pressure, valve means controlling the flow of fluid from said source to said cylinder on opposite sides of said piston, said piston rod having a return passage extending axially of said piston rod from a zone adjacent the inner end of said piston rod to a zone located exteriorly of said cylinder, a conduit establishing communication with the return passageway in said piston rod exteriorly of said cylinder and said source of fluid pressure on the return side thereof, and said piston rod having a restricted orifice considerably smaller in cross sectional area than said return passageway, said orifice establishing communication between said return passageway and the end of said cylinder on the side of said piston opposite said piston rod to form a bleed passage lowering the operating pressure in the latter end of said cylinder to compensate for the area of the piston rod and obtain substantially equal operating forces on the opposite sides of said piston.

References Cited in the file of this patent

UNITED STATES PATENTS

| 1,869,698 | Komfala | Aug. 2, 1932 |
| 2,193,898 | Carter et al. | Mar. 19, 1940 |
| 2,427,340 | Allison | Sept. 16, 1947 |

FOREIGN PATENTS

| 654,269 | Great Britain | June 13, 1951 |